United States Patent [19]

Saunders

[11] Patent Number: 4,984,830
[45] Date of Patent: Jan. 15, 1991

[54] COLLET TYPE CONNECTOR

[75] Inventor: Brian Saunders, Chipping Sodbury, England

[73] Assignee: Cooper Industries, Inc., Houston, Tex.

[21] Appl. No.: 458,957

[22] Filed: Dec. 29, 1989

[30] Foreign Application Priority Data

Nov. 2, 1988 [GB] United Kingdom ............... 8825623
Oct. 6, 1989 [EP] European Pat. Off. ........... 89310252

[51] Int. Cl.$^5$ ......................................... F16L 19/065
[52] U.S. Cl. ............................... 285/368; 285/334.2
[58] Field of Search ................. 285/84, 315, 369, 412, 285/417, 321, 322, 323, 368, 334.2

[56] References Cited

U.S. PATENT DOCUMENTS

| | | | |
|---|---|---|---|
| 1,622,768 | 3/1927 | Cook et al. | 285/369 X |
| 3,321,217 | 5/1967 | Ahlstone | 285/18 |
| 3,594,023 | 7/1971 | Yano | 285/337 |
| 4,049,297 | 9/1977 | Reneau | 285/24 |
| 4,057,267 | 11/1977 | Jansen, Jr. | 285/18 |
| 4,074,912 | 2/1978 | Van Bilderbeek et al. | 285/39 |
| 4,165,891 | 8/1979 | Sullaway et al. | 285/18 |
| 4,222,592 | 9/1980 | Saliger et al. | 285/18 |
| 4,265,470 | 5/1981 | Danner | 285/39 |
| 4,557,508 | 12/1985 | Walker | 285/84 |

Primary Examiner—Randolph A. Reese
Assistant Examiner—Heather Chun

[57] ABSTRACT

A connector for joining ends of tubular members having external grooves near the ends including a plurality of latching elements having inner projections for engaging the external grooves in the tubular members and external surfaces, a first cam ring having internal surfaces for mating with the upper external surfaces of the latching elements, a second cam ring having internal surfaces for mating with the lower external surfaces of the latching elements, threaded studs extending through said cam rings with a nut engaging each threaded end for forcing the cam rings toward each other, at least one of the upper or lower external surfaces of the latching elements being tapered so that the movement of the cam rings moves the latching elements into locking engagement with the tubular member grooves and a snap ring for biasing the latching elements radially outward.

7 Claims, 5 Drawing Sheets

COLLET TYPE CONNECTOR

BACKGROUND

This invention relates to the connection of tubular members. The invention has particular application to the connections of subsea tubular members such as wellheads and pipelines. It is a requirement of such connections that they cannot be released by pressure to which they are exposed. Furthermore, it is a requirement that the connection be releasable when there is a requirement to disconnect the tubular members.

Many prior art arrangements have used connectors which rely upon the angle of taper between locking dogs or a ring and an actuator mechanism in such a way there is a self-locking taper. This creates problems in that it relies upon the coefficient of friction between the engaged members remaining the same and the application of a lubricant may so change this coefficient that the taper does not remain self-locking.

U.S. Pat. No. 3,321,217 describes a subsea connector which is remotely actuated and relies upon a wedge ring to force locking dogs into engagement with grooves to complete the connection and also relies on a self-locking taper between the two to maintain the locked position.

U.S. Pat. No. 4,057,267 discloses a pipe connector which is said to be particularly useful for connecting underwater riser sections and includes remotely actuated hydraulic means for moving a locking dog radially inwardly into a locked position and a remotely actuated hydraulic means for moving a locking dog radially inwardly into a locked position and a remotely actuated hydraulic means for moving a cam into position to lock the dogs and their actuator in a locked position.

U.S. Pat. No. 4,222,592 discloses another type of connector for underwater members which includes an over-the-center toggle mechanism which is remotely actuated to move locking dogs into engagement with their grooves and the past center position of the toggle mechanism resists unlatching of the dogs from their grooves.

Examples of collet type connectors for the connection of tubular members are described in, for example, U.S. Pat. Nos. 4,165,470, 4,049,297 and 4,074,912.

U.S Pat. No. 4,265,891 describes a tubular connector in which first and second tubular members have external engaging means. The members can be latched by a latching means which can be releasably retained by a locking means.

U.S. Pat. No. 4,557,508 describes a tubular connector in which a collet type segmented engaging element has projections which can engage grooves in the adjacent ends of two tubular members to be connected. The engaging means is urged into engagement with the grooves by means of an actuator ring which wedges the engaging means into tight latching engagement with the grooves on the tubular members. The actuating ring is held in position by a split ring.

SUMMARY

According to the present invention there is provided a tubular connector of the type in which a segmented latching means is disposed around adjacent ends of first and second tubular member and is movable to a latching position in which grooves o either of the tubular members or the latching means is engaged by correspondingly shaped projection on the other, the connector including a pair of axially spaced cam rings which can engage the latching means and means for drawing the cam rings axially together to force the latching means into latching engagement with the tubular members. Each end of the first and second tubular members may be formed with a plurality of annular grooves engageable by correspondingly shaped projections formed on the segmented latching means.

The cam rings may be provided with a double profile inner surface which engages a radially outer profiled surface on the latching means. The means for drawing the cam rings together may comprise at least one threaded stud extending through said cam rings and having, at each end thereof, a nut engaging said threads.

A snap ring may contact the inner annular surface of the latching means to bias said latching means towards its unlatched position.

An object of the present invention is to provide an improved tubular connector which is relatively simple to handle and can be latched and unlatched quickly.

BRIEF DESCRIPTION OF THE DRAWINGS

The invention will be described now by way of example only, with particular reference to the accompanying drawings wherein.

DESCRIPTION OF THE PREFERRED EMBODIMENTS

Figure 5:
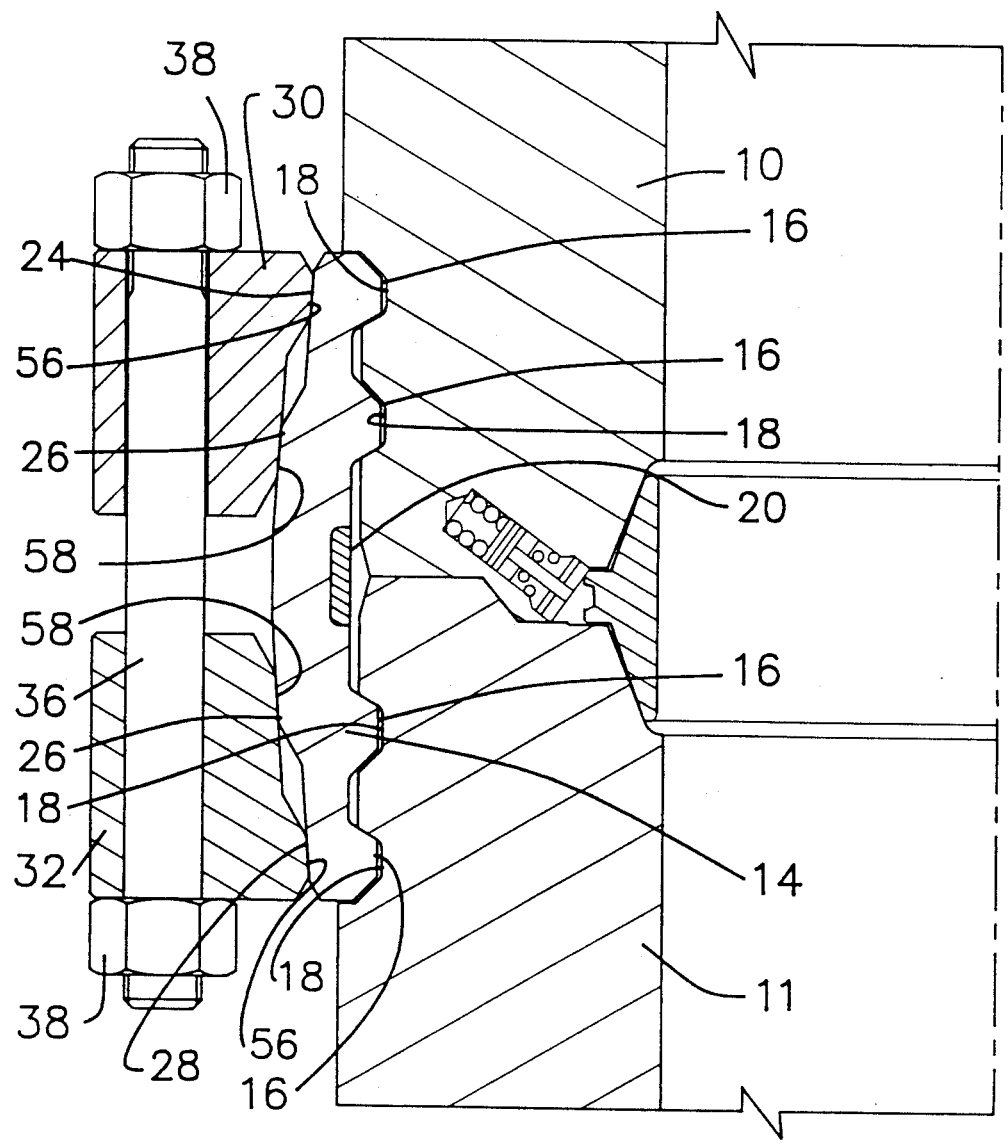
FIG. 5 is a partial sectional view on a larger scale illustrating a connector in accordance with the present invention.

Referring to the drawings, the present connector is arranged to provide a connection between two coaxial tubular members shown as 10 and 11 in FIG. 5. The connector includes latching means in the form of a plurality of circumferentially spaced collet type segments 14 which extend around adjacent ends of the tubular members 10 and 11. The collet type segments 14 have inwardly directed projections 16 which can engage correspondingly shaped grooves 18 formed in the outer periphery of each tubular member 10 and 11. A snap ring 20 engages an inner central portion of the collet segments 14 and biases these radially outwardly. As shown in, for example, FIG. 5 the radially outer surface of the segments 14 is profiled to define surface portions 24, 26, and 28.

Figure 1:
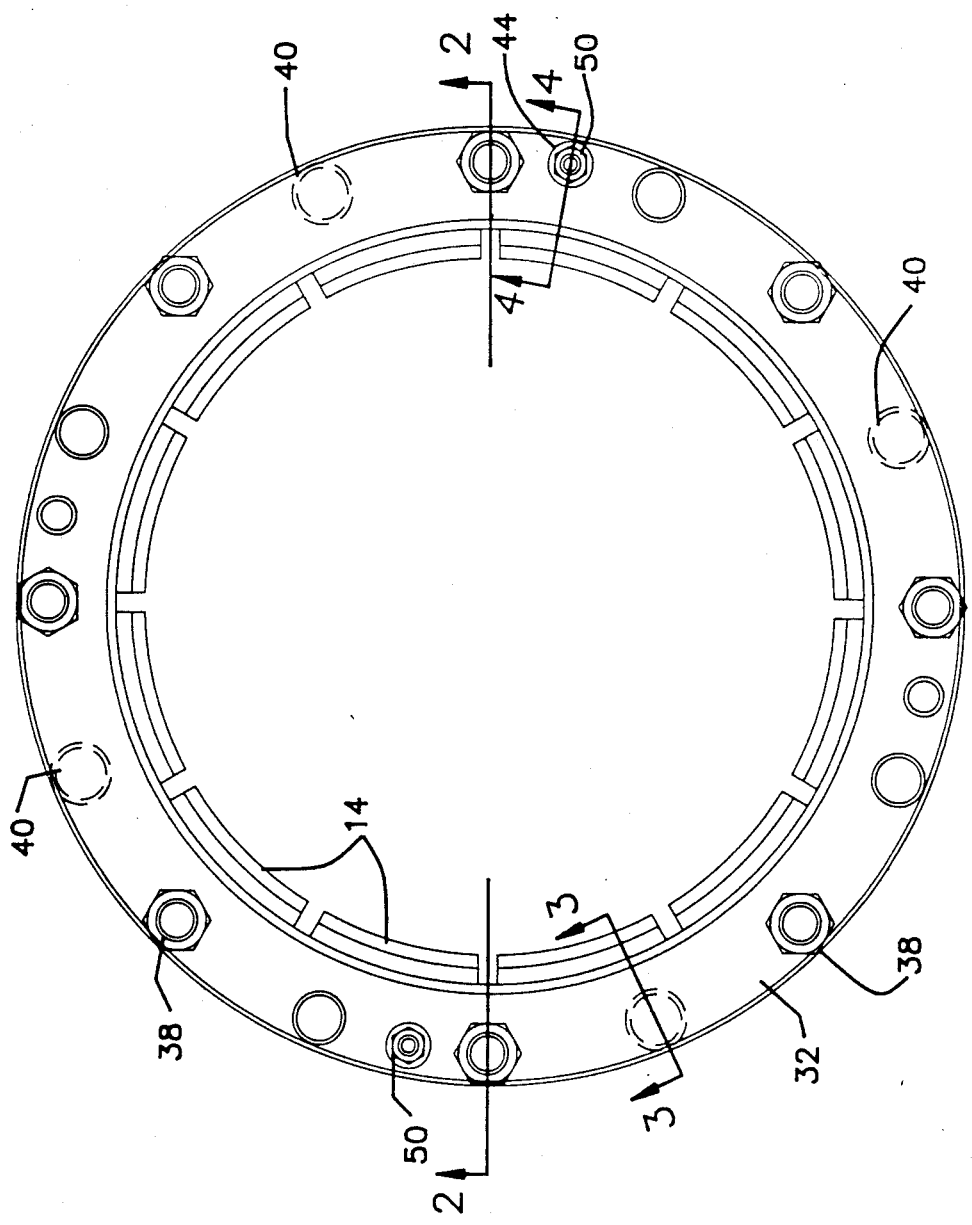
FIG. 1 is a plan view of a connector in accordance with the present invention.
Figure 2:
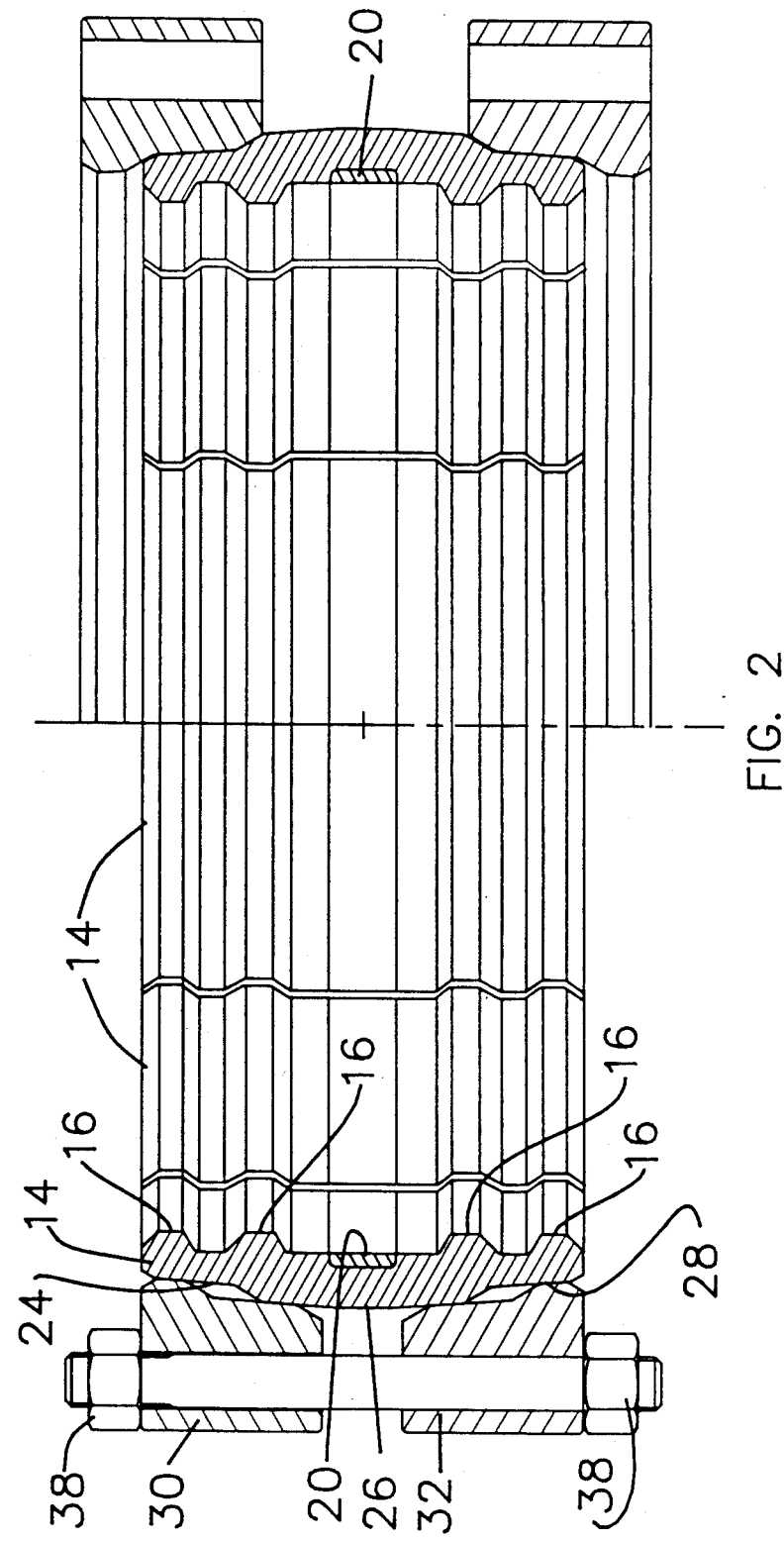
FIG. 2 is a sectional view taken along line 2—2 in FIG. 1.
Figure 3:
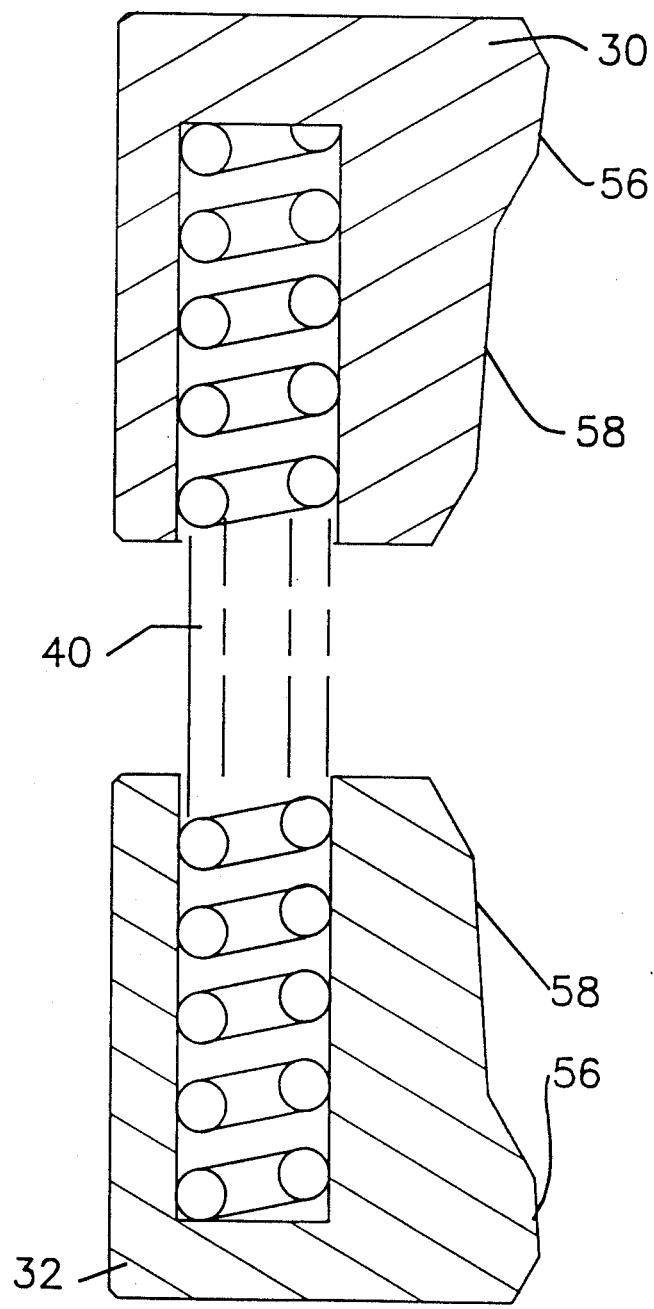
FIG. 3 is a partial sectional view taken along line 3—3 in FIG. 1.
Figure 4:
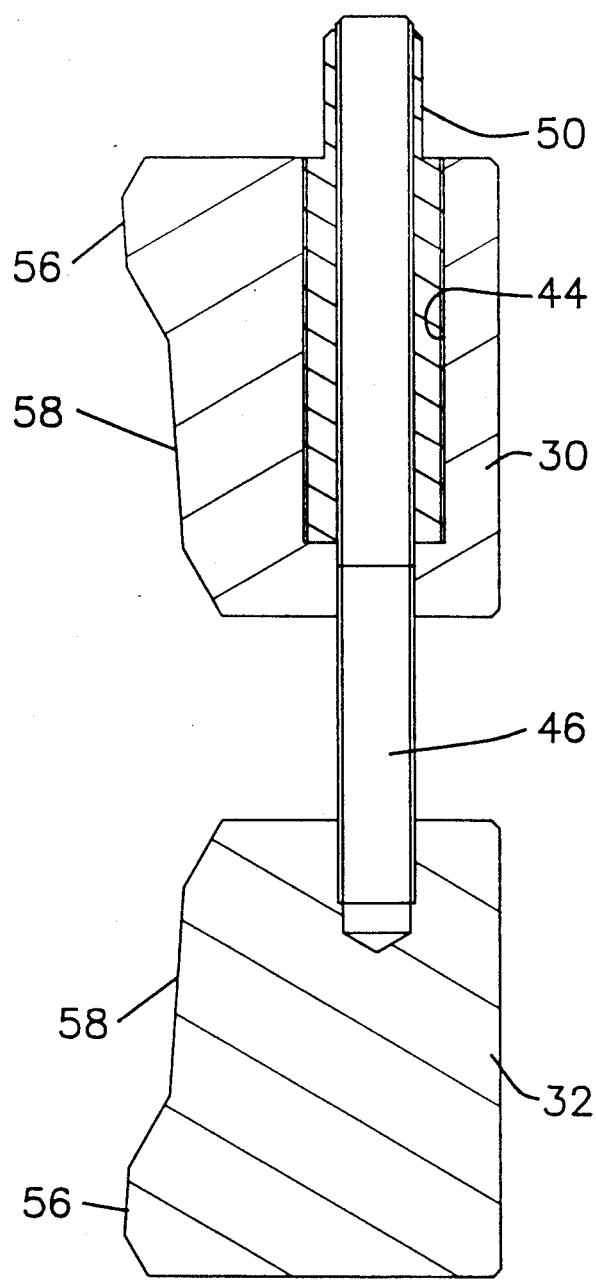
FIG. 4 is another partial sectional, view taken along line 4—4 in FIG. 1.

Upper and lower cam rings 30, 32 are disposed around the collet segments 14. The cam rings have a plurality of through bores which accommodate threaded studs 36 the opposite ends of which are engaged by nuts 38. As will be apparent, tightening of the nuts 38 has the effect of drawing the cam rings axially towards each other. Each cam ring also has four aligned closed bores (see for example FIG. 3) which accommodate compression springs 40. These compression springs act to bias the cam rings away from each other. Additionally the upper cam ring has two further through bores 44 which accommodate a threaded pin 46 which engages a threaded bore in the lower cam ring. A slave screw 50 engages the upper portion of the threaded pin 46.

As can be seen in FIG. 5 the radially inner surface of each cam ring is profiled to define a surface 58 which engages the surface 26 on the collet segments and a surface 56 which can engage the surface 24 or the surface 28 on the collet segments. In the unlatched position of the connector the cam rings are biased apart by the compression springs 40. In this position the segments 14 are biased apart by the snap rings 20 that they can be located around the tubular members 10 and 11.

In order to latch the connector the slave screws 50 are initially operated to draw the cam rings partially towards each other. This brings the surfaces 56 and 58 and the cam rings into contact with the surfaces 24, 26 and 28 on the segments 14. Then the nuts 38 are tightened to complete latching of the segments such that the projections on the segments engage the grooves formed in the adjacent ends of the tubular members 10 and 11. These studs can be tightened using a hydraulic wrench and this tightening gives the required connector preload.

The stud, nut and cam ring arrangement shown in the drawings, gives the connector a mechanical advantage of approximately six to one and this enables the connector to be constructed with a relatively small overall diameter. The result is a mechanically operated connector of compact overall size which has a high clamping preload and high bending moment capacity. The connector has the advantage that it is easy to handle and operate. The slave screws 50 enable the connector elements to be moved quickly from the unlocked to the locked position.

The overall size is small compared with a conventional API flange or traditional hub clamp. In the present connector, the collets take mainly direct stress and the cam rings mainly hoop stress. When the connector is latched the clamping loads do not go through the studs and the interface between the cam rings and collets is a locking taper.

When it is desired to unlatch the connector this can be achieved by using jack screws in tappings in the top of the cam ring to break the locking taper.

In the arrange described above, twelve collet segments 14 are used. It will be appreciated that connectors in accordance with the invention can be constructed which have different numbers of such segments.

What is claimed is:

1. A tubular connector, comprising:
    a first tubular member and a second member, each having ends shaped to receive a plurality of segmented latching means thereon,
    a pair of axially spaced cam rings which can engage said segmented latching means,
    means for drawing the cam rings axially together to force the latching means into latching engagement with the ends of said tubular members, and
    a snap ring contacting the inner annular surface of the latching means to bias said latching means towards its unlatched position.

2. A connector as claimed in claim 1, wherein each end of the first and second tubular members are formed with a plurality of annular grooves engageable by correspondingly shaped projections formed on the segmented latching means.

3. A connector according to claim 1 wherein the cam rings are provided with a double profile inner surface which engages a radially outer profiled surface on the latching means.

4. A connector according to claim 1 wherein the means for drawing the cam rings together comprises
    at least one threaded stud extending through said cam rings and having, at each end thereof, a nut engaging said threads.

5. A tubular connector for joining the ends of tubular members having external grooves comprising:
    a plurality of latching segments positioned around the ends of the tubular members to be joined and having internal projections for engaging within the external grooves in each of the tubular members,
    said latching segments having upper and lower external surfaces,
    an upper cam ring having internal surfaces for engaging the upper external surfaces of the latching segments,
    a lower cam ring having internal surfaces for engaging the lower external surfaces of the latching segments,
    means biasing said latching segments outwardly,
    means for interconnecting said cam rings to cause said rings to move toward each other while in engagement with the external surfaces of the latching segments, and
    a taper on at least one of said upper and said lower portion of said external surfaces of the latching segments,
    said cam ring internal surfaces mating with the external latching segment surfaces with which they engage whereby movement of the cam rings cams the latching segments into locking engagement with the exterior of the tubular members.

6. A connector according to claim 5 wherein said cam ring moving means includes
    at least one threaded stud extending through said cam rings and having at each end thereof, a nut engaging said threads.

7. A connector according to claim 5 wherein said biasing means includes
    a snap ring contacting the inner annular surface of each of the latching segments to bias said latching segments towards their unlatched position out of engagement with the external grooves on said tubular members.

* * * * *